United States Patent

[11] 3,603,465

[72] Inventor Kenneth J. King
 32 Penn Ave South, Minneapolis, Minn. 55405
[21] Appl. No. 878,293
[22] Filed Nov. 20, 1969
[45] Patented Sept. 7, 1971

[54] BOAT CENTERING AND GUIDING DEVICE FOR BOAT TRAILERS
5 Claims, 4 Drawing Figs.

[52] U.S. Cl. .................................................. 214/84, 280/414
[51] Int. Cl. ...................................................... B60p 1/52
[50] Field of Search ........................................... 214/84, 505, 506; 280/414, 143

[56] References Cited
UNITED STATES PATENTS
2,827,304 3/1958 Backus ......................... 280/143
2,977,012 3/1961 Maunula ....................... 214/505
3,031,093 4/1962 Holsclaw ...................... 214/505
3,455,472 7/1969 Rankin, Jr. .................... 214/84

Primary Examiner—Albert J. Makay
Attorney—Williamson, Palmatier & Bains

ABSTRACT: A novel boat centering and guiding device closely cooperates with the frame, the centered keel-plate-receiving rollers and the winch and winch cable of most conventional types of boat trailers. The device or apparatus employs a pair of spaced oppositely arranged spring-tensioned roller elements mounted close to the respective ends of the trailer roller which first receives the bow of the boat in loading. Upstanding spring mechanisms on which said cooperating rollers are mounted are anchored at their lower ends somewhat below the axis of the receiving trailer boat-receiving roller so the first keel plate portion of the bow of the boat is yieldingly engaged thereby centering the boat relative to the length of the trailer and thereafter the springs yield to the configuration but continue to engage lower portions of the boat adjacent the keel plate thereof for assuring center guiding of the boat throughout its length upon the boat trailer.

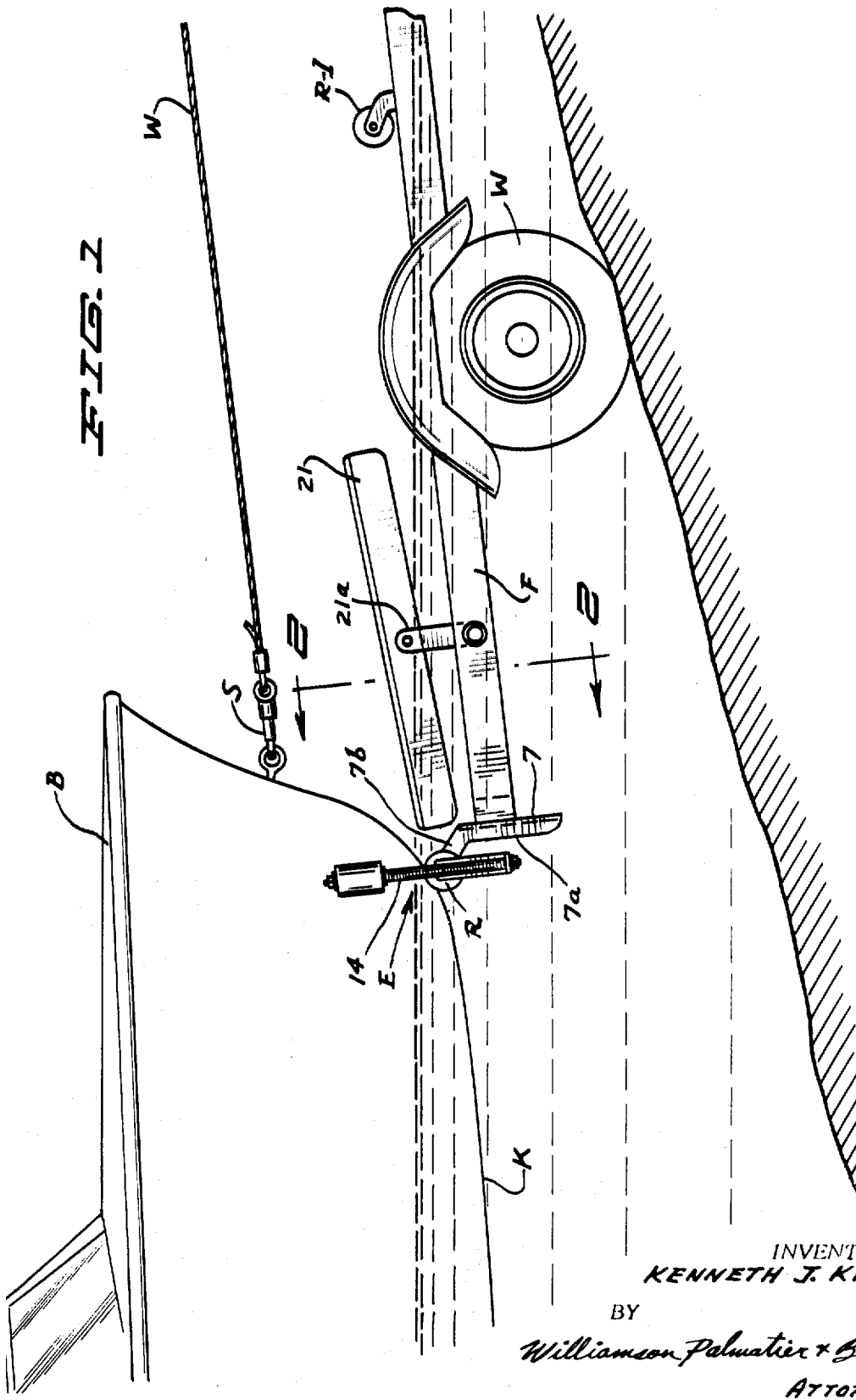

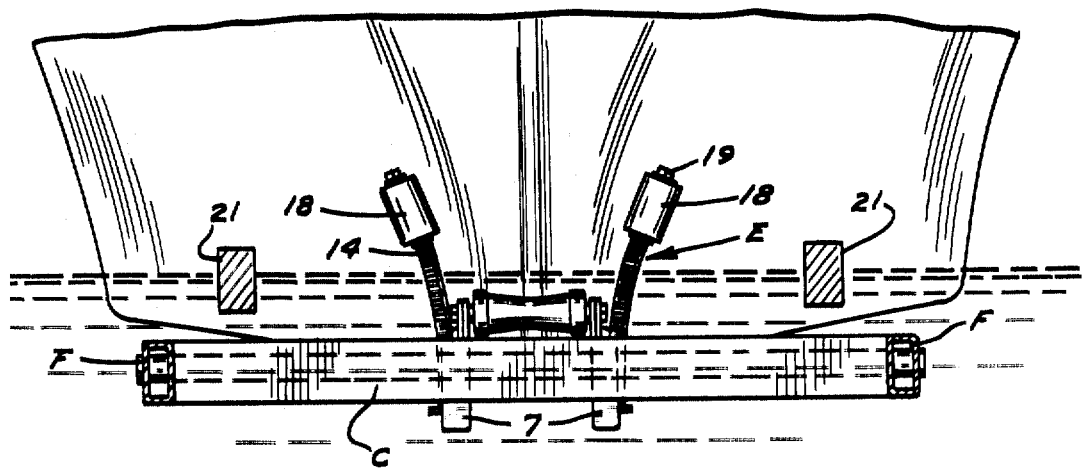
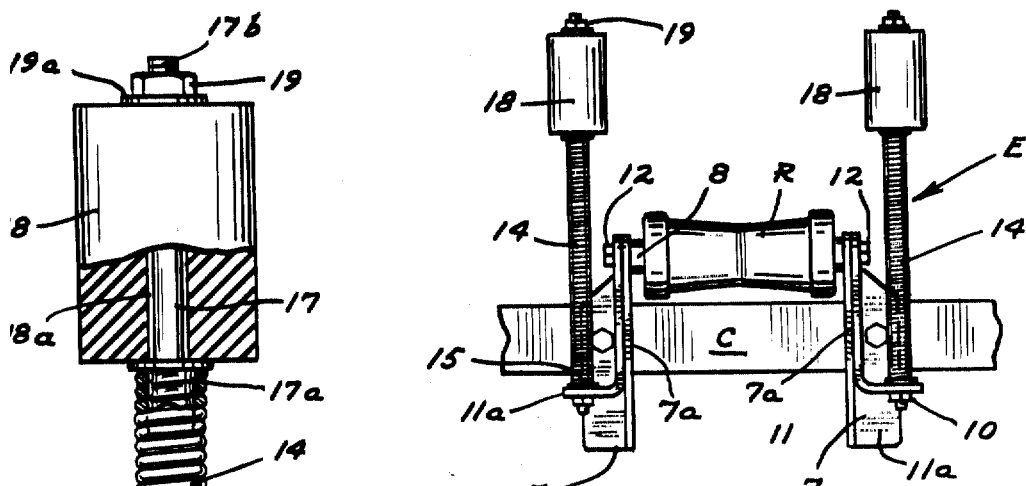
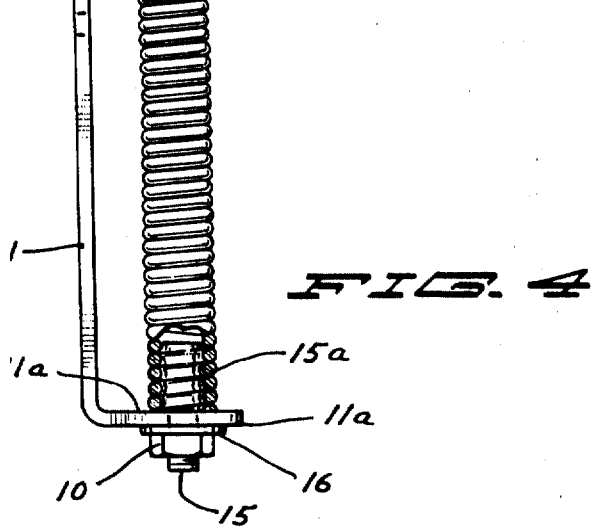

BOAT CENTERING AND GUIDING DEVICE FOR BOAT TRAILERS

The present invention relates quite generally to conventional boat trailers and more particularly to a device for centering and accurately guiding the boat upon the rear-receiving rollers and the additional supporting rollers of the trailer despite normal displacement of the boat due to winds and waves.

It is an object of the invention to provide a device of the class described which involves a minimal number of parts, may be made and sold at a low price and which closely cooperates and is preferably mountable upon the medium for mounting the rear receiving roller of a boat trailer.

A more specific object of the invention is to provide in boat centering and guiding apparatus of the class described a simple pair of brackets which may be mounted upon the rear portion of the trailer, in fact, upon the common sleeve or shaft upon which the rear-receiving roller of the trailer is mounted, and comprising guide arms pivoted to said brackets at the lower end thereof and urged upwardly and inwardly by coil spring action and carrying at their upper portions oppositely elated roller elements for closely cooperating with the contour of the bow extremity and all contours of the boat adjacent the longitudinal keel plate thereof.

Another object is the provision of apparatus of the class described wherein even under adverse water conditions (wind and current) one person alone can quickly and accurately load boats varying substantially in beam, assuring center guiding of the bow, waist and entire length of the boat upon the trailer. This invention as contrasted with prior art devices, accomplishes centering of the boat throughout its length by application of opposed tensioned rollers engaging contours of the boat contingent to the keel plate thereof. Since many conventional boat trailers are of the tilt-bed type the term "rear-receiving roller" as herein used means the central trailer roller which first engages the bow of the boat in loading.

The foregoing and other advantages of the invention will be more apparent from the following detailed description made in conjunction with the accompanying drawings, wherein:

FIG. 1 is a side elevation showing an embodiment of my invention applied to the rear central portion of a conventional type of boat trailer, and illustrating the forward or bow portion of a boat as it is initially pulled by a winch cable onto the rear receiving roller of the trailer, thus positively centering and guiding the boat with respect to the receiving rollers on the trailer;

FIG. 2 is a cross section taken on the line 2—2 of FIG. 1, illustrating the initial centering and guiding position of my tensioned centering elements, with the bow portion adjacent keel plate of the boat;

FIG. 3 is a detail rear elevation showing the rear receiving roller of the trailer, and the construction and combination of my opposingly arranged spring-tensioned roller elements therewith; and FIG. 4 is a detail rear elevation of one of the two centering and guiding elements detached, with portions broken away and shown in cross section.

Referring now to the embodiment of my invention illustrated it will be noted that it is combinatively applied to the rear end and central portion of a conventional boat trailer supported mainly at its rearward medial portion by a pair of wheels W and having the conventional widely spaced, longitudinal frame members F which are rigidly interconnected at their rear ends by a rigid crossbeam C.

At the center of cross beam C, a conventional type of rear boat-receiving roller bracket is rigidly affixed, as shown, comprising a pair of generally L-shaped depending brackets 7, which have vertical stem portions 7a welded or otherwise rigidly affixed to the rear surface of cross beam C, and which have outwardly extending mounting portions 7b wherein is removably mounted the horizontal journal 8 for the rear roller R for first receiving the keel plate at the bow portion of a boat B. Roller R has a centrally concaved periphery of preferably somewhat compressible material mounted upon a bearing sleeve (not shown) which in conventional style is freely journaled upon the horizontal journal 8. As shown in FIG. 1, a winch cable W is illustrated attached by snap hook S with a rugged eyebolt or other fastening secured at an appropriate height to the bow of boat B.

In the simple form herein illustrated, my invention works in close combinative relation with the rearmost boat-receiving roller R of a conventional boat trailer and of course with the pull cable W and the additional central transverse rollers R-1 which are longitudinally of the trailer frame aligned with rear roller R. The conventional boat trailer illustrated in the drawings herein is not of a "tilt-bed" type. It is to be understood that in tilt-type trailers often the intermediate transverse rollers are longitudinally aligned with the rearmost, are immersed partially in the water and one or more thereof may constitute the receiving roller which has closely adjacent to the ends thereof my closely cooperating mechanism applied thereto.

As illustrated, I provide a pair of identical but oppositely arranged centering and guiding elements, indicated as entireties by the letter E, affixed at their lower ends as by clamping bolt structure 10 to the out-turned ends 11a of L-shaped sturdy, rigid mounting brackets 11. Brackets 11 at their upper ends as shown have apertures for receiving the ends of the mountings for journal 8 of the rear roller which are normally threaded and receive the heavy retaining nuts 12.

My boat centering and guiding elements E each comprise an elongate closely coiled spring 14 which constitutes a generally cylindrical and tubular upstanding tensioned element normally extending vertically and substantially perpendicularly to the axis of one end of roller R. At the lower end of the coiled spring 14 is affixed a vertical supporting member 15 which, as shown, comprises an upstanding rigid tapping cap having an depending axial attachment screw extending through horizontal extension 11a of mounting bracket 11 and clamped by the nut 10 with a washer 16 interposed between said nut and the bracket extension.

Similarly, at the upper end of the elongate coiled spring 14 of each element a rigid self-tapping cap 17 is threadedly and rigidly secured and integrally carries an axial journal 17a upon which is mounted for free rotation the bearing sleeve 18a of roller 18, preferably constructed of firm but somewhat compressible material. The upper end of the vertical journal 17a is threaded at 17b to engage a retaining nut 19 and, as shown, a washer 19a is interposed between said nut and the upper end of roller 18.

From the foregoing and particularly with reference to FIGS. 2 and 3 of the drawings, it will be noted that the two tensioned boat-centering elements, designated as entireties by the letter E, are disposed in oppositely arranged positions with the lower ends thereof rigidly connected with caps 15, being anchored to bracket 11 at points some distance below the axis of the rear boat-receiving roller R. Said elements E in initial receiving position stand upright substantially perpendicular to and in close relation with the respective ends of the receiving roller R on the trailer. The rollers 18 at the upper ends of elements E are positioned thus to engage the varying contours of the lower portion only of the boat relatively close to the keel plate thereof and throughout the length of the boat.

In the conventional form of boat trailer illustrated, a pair of very widely spaced bottom rests 21, for receiving the underside of the stern of the boat, is shown tiltably supported on upstanding rigid lugs 21a which, as shown, are secured to the longitudinal frame members F. It will be understood that, while the illustrated conventional boat trailer is of the nontilt type, my invention and the actual structure described and claimed herein is equally applicable to trailers of the "tilt-bed" type which, near the forward end of the main frame, unlatch and can be tilted on the axes of the axles of the rear wheels W. In such instance my improved structure will be mounted on one of the forwardly disposed centrally located keel-platereceiving rollers R-1 and related with the axis thereof in the precise manner as shown in the embodiment illustrated. In this connection if desired, in a tilting bed trailer, two or more sets of my closely cooperating upstanding elements E may be suitably mounted on similar brackets to that shown and placed upon two or more of the rollers R and R-1 to insure that in tilting of the bed of the trailer for initially receiving the boat the contour of the boat and keel plate will be simultaneously engaged and centered to insure full center guiding of the boat to its full loaded position upon the trailer.

OPERATION

While the general operation of my combinative device is probably obvious from the foregoing description, it is thought to be important to point out new and improved functional advantages which help to distinguish my invention from the prior art. In utilizing my apparatus, the winch cable W is usually paid out overlying the rear rollers R-1 and the forward roller R, whereafter the snap hook S is secured to the heavy eye at the extreme edge of the bow of the boat with the boat generally extending longitudinally of the trailer. A single operator wading or even standing on a board or partition on the trailer then initially starts the engagement of the under bow portion and keel plate with then then most rearward roller. Thus if a tilt-type trailer is employed, the roller would probably be rearwardly disposed of the roller R in the drawings. In so doing this and engaging the bow keel plate with the concave roller R, the contingent sides of the bow are resiliently and firmly engaged by the opposed rollers 18 of my elements E, the contacts being made very close to the keel plate.

Thereafter, the winch is powered by hand or motor and even though there are crosscurrents or wind, the contour at the lower portion of the boat adjacent the keel plate is constantly engaged by the rollers 18 with substantial tension on the upstanding springs 14 thus continuing to center longitudinally the boat relative to the trailer during its entire loading operation, and, in fact, until the under stern portions of the boat are slid to rest upon the tiltable support beams 21 at the rear of the trailer.

From the foregoing it will be seen that it matters not as to the variance in external contours of the boat or variance in the width or beam of the boat at maximum. The cooperating elements E work equally well on boats varying considerably in length and varying widely in contours and beam. Centering is assured because of engagement cooperatively of opposite sides of the keel plate portions at least near the actual location of the keel plate which is directly supported in loading of the boat upon the indented rollers R and R-1.

The versatility of the simple mounting and attachment means for my device enables it to be applied to almost all conventional types of boat trailers now in use, and usually does not require any additional attachment elements than are already provided for the anchoring of at least one of the rollers R and R-1.

What is claimed is:

1. In combination with the components of a conventional boat trailer including a centered, rear, journaled and horizontally mounted initial receiving roller and additional keel-plate-receiving and supporting rollers spaced therefrom in direction longitudinal of the carrier; and a rigid carrier frame having a pulling device mounted thereon which imparts pull on a flexible element such as a cable longitudinally and forwardly relative to said trailer, a pair of cooperating, oppositely arranged, upstanding boat-engaging members mounted in juxtaposition to the respective ends of the said receiving roller and having means for resiliently urging said members upwardly in upstanding position, means for anchoring the lower end of said members to the rear of said trailer at points below said rear roller, rollers rotatably mounted on the outer ends of said boat-engaging members whereby with said opposed spaced relation said rollers initially and snugly engage and center the forward bow portion of a boat in loading action of said trailer, and thereafter shift with outward and opposite deflection of said resilient members to engage portions of the lower contour of the boat adjacent the keel plate thereof, for center-guiding said boat throughout its length as it is loaded upon the trailer, and said boat-engaging members including upstanding, closely coiled spring elements firmly anchored at their lower ends and carrying axial journals at their upper ends upon which said rollers are mounted.

2. The structure set forth in claim 1 and a pair of depending mounting brackets, one for each of said boat-engaging members, each having at its upper end a means for connection with an end extension of the journal of said rear, initially receiving roller.

3. The structure set forth and defined in claim 1 wherein said means for anchoring the lower ends of said members constituting coiled spring elements, comprise self-tapping rigid upright studs having attachment means at the lower ends thereof.

4. The structure set forth in claim 1 wherein said coiled spring elements have rigidly and axially attached at their upper ends rigid self-tapping members and wherein, said axial journals are rigidly affixed axially to said self-tapping members.

5. The structure set forth in claim 2 wherein each of said mounting brackets has an apertured upper end for receiving an extension of the journal of the receiving roller of the oat trailer and has also adjacent its lower portion a generally horizontally extending rigid part to which the lower end of said boat-engaging member is secured.